J. BESCH.
HEADLIGHT REFLECTOR.
APPLICATION FILED JULY 15, 1919.

1,381,161.

Patented June 14, 1921.

INVENTOR
Joseph Besch
By John C. Matson
ATTORNEY

UNITED STATES PATENT OFFICE.

JOSEPH BESCH, OF ALBANY, NEW YORK.

HEADLIGHT-REFLECTOR.

1,381,161.  Specification of Letters Patent. Patented June 14, 1921.

Application filed July 15, 1919. Serial No. 310,960.

*To all whom it may concern:*

Be it known that I, JOSEPH BESCH, a citizen of the United States of America, residing at the city of Albany, in the county of Albany and State of New York, have invented certain new and useful Improvements in Headlight-Reflectors, of which the following is a specification.

My invention relates to automobile headlights, and the objects of my invention are, first: to protect the driver of an approaching vehicle from headlight glare; second: to illuminate the front of the vehicle so that the driver of an approaching vehicle can see it; third: to illuminate the ground directly in front, underneath and at the sides of the vehicle, thus facilitating driving; fourth: to illuminate the front license plate; fifth: to provide a substitute for dimming devices, which will provide sufficient illumination directly in front, underneath and at the sides of the vehicle for safe driving; together with such other elements and combinations as are hereinafter more particularly set forth.

I accomplish these objects by the device illustrated in the accompanying drawing, in which.

Similar numerals refer to similar parts throughout the several views.

Figure 1:
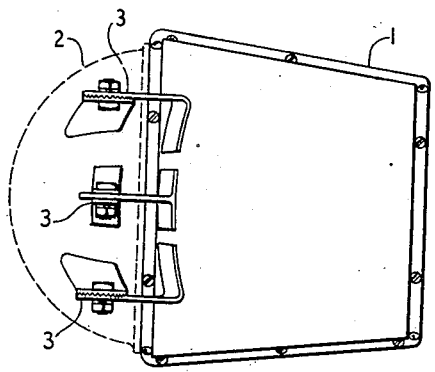
Figure 1 is a plan view of my device as seen from the top.
Figure 2:
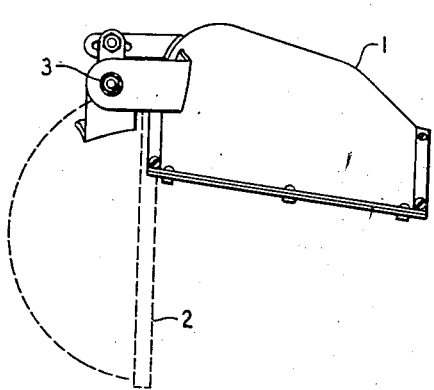
Fig. 2 is a side view of my device.

The body or hood of the device, 1, is curved to conform to the shape of the headlight, 2, and projects forward from said headlight and is secured thereto by means of adjustable clamps, 3, Figs. 1 and 2, in such a manner as to permit varying the angle which the hood, 1, makes with the horizontal.

Figure 4:
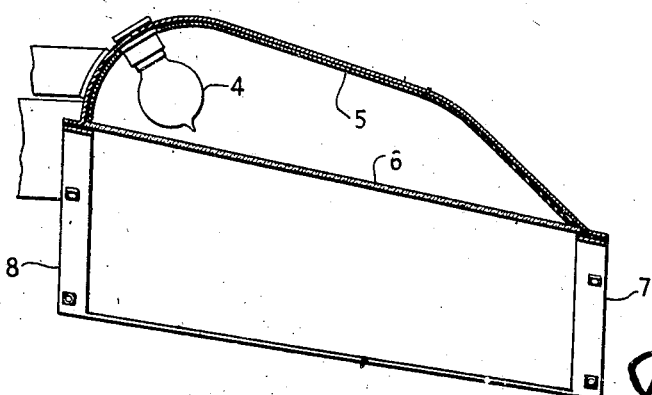
Fig. 4 is a section along the line, 4—4, on Fig. 3.

A light, 4, shown in Fig. 4, which may be operated independently of the headlights, is mounted inside the hood, 1.

The inside of the hood, 1, may itself be a reflecting surface, or preferably a separate reflector may be placed inside said hood, as shown at 5, Fig. 4. Said reflector, 5, is of such shape that the light rays, either from the headlight, 2, or from the auxiliary light, 4, will be reflected backward, downward and sidewise.

Figure 3:
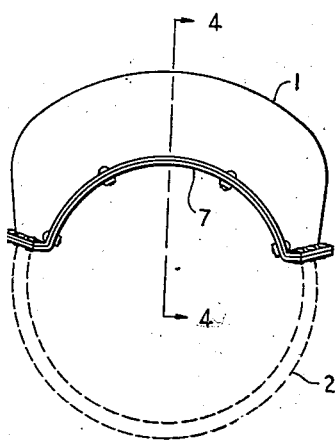
Fig. 3 is a front view of my device.

A pane of glass, 6, Fig. 4, curved to fit the lower rim of the hood, shown at 7 and 8 in Figs. 3 and 4, closes the device, thus excluding water, dust and any other matter which might damage the reflector. Said pane of glass may be either of plain or ground glass, as desired.

The portions of the adjustable clamps 3, 3, which are attached to the headlight 2, may be placed so that the hood 1, will stand symmetrical with reference to the vertical axis of the headlight, or they may be so placed that the hood when attached will lean toward the center of the car and will throw the light rays toward the gutters or ditches which may parallel the road on which the car is traveling.

The operation of my device is as follows:

The headlight, 2, is focused in the ordinary way, so that it projects a beam made up of rays only slightly divergent. This beam passes undisturbed under the device and provides a driving light as effective as the ordinary form of glaring headlight.

The forward end of the device being some distance ahead of the headlight, 2, may be set by means of the adjustable clamps, 3, in such a position as to intercept any rays of the beam which otherwise would rise high enough to reach the eyes of the driver of an approaching vehicle within any distance through which such rays would have a blinding effect.

The rays so intercepted, together with the direct rays from the lamp of headlight, 2, are reflected by the reflector, 5, backward, downward and sidewise, thus illuminating the front of the vehicle so that the driver of an approaching vehicle can see it, thus enabling the vehicle to pass without danger of collision or ditching, as is the case when nothing but the lights of the approaching vehicle can be seen. At the same time, the ground directly in front and at the sides of the vehicle is illuminated, thus allowing the driver to drive close to ditches, curbs, etc., without danger of accident. The front license plate, if placed low enough, is also illuminated.

For city driving, the main headlights may be dimmed or turned off and the auxiliary light, 4, Fig. 4, turned on. This light then performs all the functions previously enumerated as being performed by the main headlights except that it throws no horizontal beam ahead of the vehicle and, in addition, part of the light is thrown forward and downward, providing illumination ahead of the vehicle. This prevents any blinding effect, even at ground level, a short distance ahead of the vehicle, but by a proper placing of the light, 4, shaping of the reflector, 5, and adjustment of clamps, 3, the ground may be illuminated a sufficient distance ahead to insure safe driving. Thus the light, 4, may be made as powerful as desired without danger of breaking glaring headlight laws.

If the glass pane, 6, is ground, the operation of the device will be substantially as described above, but the light reflected from the reflector will be diffused.

What I claim as my invention and desire to secure by Letters Patent is:

1. In a device of the character described, a body or hood curved to conform to the shape of the headlight, projecting forward from said headlight and secured thereto by means of adjustable clamps in such a manner as to permit varying the angle which said hood makes with the horizontal; a light mounted inside said hood; the inside of said hood being a reflecting surface and said hood being so shaped that the light rays, either from said light or from the headlight, will be reflected backward downward and sidewise; and a pane of plass curved to fit the lower rim of said hood and closing the device.

2. In a device of the character described, a body or hood curved to conform to the shape of the headlight, projecting forward from said headlight and secured thereto by means of adjustable clamps in such a manner as to permit varying the angle which said hood makes with the horizontal; a light mounted inside said hood; inside said hood a reflector so shaped that the light rays, either from said light or from the headlight, will be reflected backward, downward and sidewise; and a pane of glass curved to fit the lower rim of said hood and closing the device.

In testimony whereof I have affixed my signature.

JOSEPH BESCH.